United States Patent Office 3,312,634
Patented Apr. 4, 1967

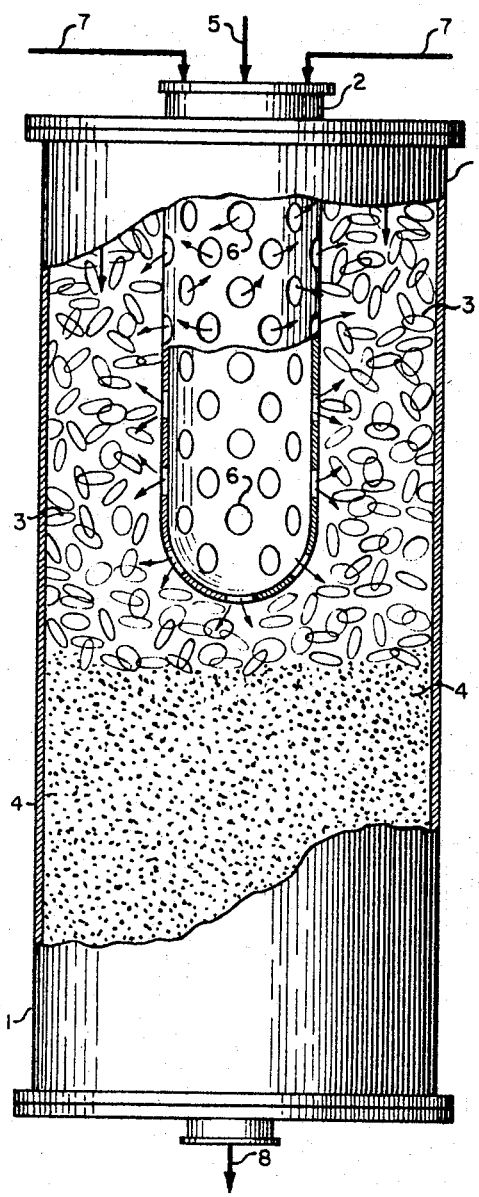

3,312,634
PROCESS FOR NAPHTHA REFORMING
Arnold R. Bernas, Nixon, and John S. Negra, South Plainfield, N.J., assignors to Chemical Construction Corporation, New York, N.Y., a corporation of Delaware
Original application Dec. 5, 1962, Ser. No. 242,564. Divided and this application Dec. 4, 1964, Ser. No. 418,378
9 Claims. (Cl. 252—373)

This invention relates to the catalytic steam reforming of normally liquid hydrocarbons such as naphtha, to produce synthesis gas principally containing hydrogen and carbon monoxide, and is a division of application Ser. No. 242,564 filed Dec. 5, 1962, and now abandoned. An improved process has been developed for this purpose, in which the reaction is readily controlled to provide uniform temperature levels throughout the process stream, and conversion of the hydrocarbon is accomplished without carbon deposition. The process of the present invention is a preferred procedure for accomplishing the naphtha reform process disclosed in U.S. patent application Ser. No. 160,-749 filed Dec. 20, 1961, now U.S. Patent No. 3,262,886.

The conversion of normally liquid hydrocarbons such as naphtha to synthesis gas has been accomplished in several ways. One general approach is known as partial oxidation. In this procedure, liquid hydrocarbon is reacted with oxygen or oxygen-enriched air in a non-catalytic furnace at highly elevated temperature above 2000° F. The liquid hydrocarbon is gasified and completely reacted at this elevated temperature, to yield a synthesis gas stream also containing free carbon. This process is relatively costly since free oxygen must be provided for the reaction. Another high-temperature procedure involves the use of refractory beds which are alternately heated and then employed as a heat source for hydrocarbon gasification in a cyclic process sequence. This type of procedure is subject to the drawbacks of all cyclic processes, such as intermittent and alternating stream flow, lack of uniformity in stream composition, and excessive control instrumentation requirement.

In the present invention, a process is provided by means of which naphtha or similar normally liquid hydrocarbon may be catalytically reformed by reaction with steam, at temperatures in the range of 1600° F., to provide synthesis gas. The improved process basically includes a new catalyst arrangement, in which a bed of metallic particles comprising nickel is provided in combination with an adjacent bed of conventional hydrocarbon reform catalyst such as nickel oxide deposited on kaolin or other carrier. Streams of vaporized naphtha, steam and process air are combined and the resulting process stream is passed through the bed of metallic particles and then through the bed of hydrocarbon reform catalyst. The beds are heated by conventional means. A fully reformed synthesis gas is produced.

The major novel aspect of the present invention involves the provision of a bed of metallic nickel-containing particles prior to the bed of conventional hydrocarbon reform catalyst. The bed of metallic particles performs several important functions. Due to high thermal conductivity of the particles, a substantially uniform temperature level prevails in the process stream. Thus, localized overheating or temperature reduction with consequent carbon deposition is prevented. When the reforming takes place in a reformer tube mounted in a furnace, the high thermal conductivity of the metallic particles also serves to prevent overheating of the tube wall. In addition, because the metallic particles contain nickel, a certain amount of endothermic steam reforming takes place. However, this reaction is relatively slow in the metallic bed, and thus the reaction is spread out and localized high reaction rate is avoided. A balance between heat transfer into the process stream and reform reaction rate is obtained, so that a uniform temperature level is maintained. A high initial reform reaction rate is objectionable, since this results in localized temperature reduction and consequent carbon deposition.

In summary, the bed of metallic nickel particles has three major functions. One function is to allow reforming to take place at 1600° F.–1650° F. but at a slower rate than would occur with conventional reforming catalyst. This reduces the amount of heat input through the tube walls which is required to maintain a minimum bed temperature of 1600° F.–1650° F., and thus lowers the tube wall temperature. A second function is to permit reforming while avoiding carbon deposition, as contrasted to other materials such as ceramic which promotes carbon deposition at 1600° F.–1650° F. A third function of the nickel particles is to improve heat transfer from the tube wall to the process stream, because the effective thermal conductivity of the nickel bed is greater than that of a conventional reform catalyst bed.

It is an object of the present invention to catalytically reform naphtha to produce synthesis gas.

Another object is to provide an improved process for catalytic reform of naphtha.

A further object is to provide a process for catalytic naphtha reform without carbon deposition.

An additional object is to provide a process for catalytic naphtha reform with more uniform temperature distribution and improved control of reaction rate.

These and other objects and advantages of the present invention will become evident from the description which follows. Referring to the figure, a preferred embodiment of the present invention is shown, in which the two beds of reform material are disposed in a reformer tube 1 which is provided with a central distributor tube 2. Tube 2 is coaxially aligned within tube 1, and extends down into bed 3 which consists of metallic nickel rings in this preferred embodiment. A lower bed 4 consisting of conventional hydrocarbon reform catalyst, preferably activated nickel oxide deposited on kaolin, is also provided in the lower part of tube 1.

Tube 1 is typically mounted in a furnace, not shown, and is externally heated by conventional burners, not shown. A stream of vaporized naphtha is passed via 5 into central tube 2, and is mixed with a preheated mixed stream of steam and air which is passed via 7 into distributor tube 2. The resulting mixed process stream passes downward through tube 2, and is discharged through holes 6 into bed 3. Two principal reactions take place in tube 2 and bed 3. Part of the naphtha vapor is immediately oxidized by reaction with the air component of stream 7. This exothermic reaction does not result in a temperature rise, because endothermic reaction between steam and naphtha vapor also takes place in bed 3 and is catalyzed by the nickel rings. This reform reaction predominates, however concomitant temperature decrease in bed 3 is prevented due to heat transfer through tube wall 1 and into bed 3. The high heat transfer rate which is obtained due to the presence of the nickel rings is highly important in providing uniform temperature levels in bed 3, since carbon deposition is thus effectively prevented. Any sharp temperature rise could cause carbon deposition due to accelerated cracking of the naphtha vapor, while a temperature decrease below 1600° F. at any point may also cause carbon deposition due to unfavorable equilibrium in the steam-carbon reaction.

The resulting partially reformed mixed process stream now passes downward from bed 3, and contacts catalyst bed 4 where complete steam reform of the naphtha and lower hydrocarbons derived from naphtha cracking takes place. The resulting fully reformed synthesis gas stream is recovered via 8 from tube 1, and is passed to process utilization.

It will occur to those skilled in the art that the process of the present invention bears a superficial resemblance in terms of catalytic function to certain disclosures of the prior art. Thus, the concept of providing two beds or layers of catalytic material with different activity, and initially passing the process stream through the less active bed, is found in such prior art as U.S. Patents Nos. 2,801,159 and 2,056,911 and Canadian Patent No. 597,393. However, it should also be evident that an important distinction in terms of function is achieved in the process of the present invention, due to the fact that the nickel rings have a high heat conductivity. Thus, the heat conductivity of prior art low activity catalyst beds is quite low, since these beds consist of refractory-type catalyst with deposited activated nickel or other catalytic component. Thermal conductivity of various catalytic carrier agents as contrasted to nickel is shown by the following table.

TABLE I

| Material | Conductivity (cal./sec./cm.²/cm./° C.) | Temp. ° C. |
| --- | --- | --- |
| Nickel | 0.088 | 600 |
| Do | 0.068 | 800 |
| Magnesia (brick) | 0.0027–0.0072 | 50–1,130 |
| Porcelain (kaolin) | 0.0039–0.0047 | 165–1,055 |
| Alumina | 0.00162 | |
| Alundum | 0.0084 | 650–1,250 |
| Firebrick | 0.0011 | |

It will be evident from the above table that representative refractory materials employed as catalytic carrier agents have thermal conductivities which are below 10% of that of nickel. Thus, a marked increase in heat transfer rate and a substantially uniform temperature level are obtained when nickel is employed in bed 3.

Numerous variations within the scope of the present invention will occur to those skilled in the art. Thus, it is possible and in some cases preferable to omit the central distributor tube 2. Thus, depending on the type of liquid hydrocarbon involved, it may be preferable in some cases to merely spray or vaporize the liquid hydrocarbon into the mixed air-steam input stream, and then to pass the resulting mixed process stream into bed 3.

Another variation or modification of the present invention involves bed 3. The metallic particles of bed 3 are preferably nickel rings, however other particle shapes such as turnings, irregular pieces, mesh or balls may be employed in suitable cases. In addition, although the metallic particles of bed 3 are preferably composed of substantially pure nickel, various metal alloys containing nickel such as 18–8 stainless steel may also be employed.

The hydrocarbon reform catalyst employed in bed 4 may be any conventional catalytic agent. Typically, bed 4 will consist of nickel oxide deposited on or dispersed in support particles of a refractory composition or material such as those listed in Table I supra. Other catalytic agents or elements such as zirconia, chromia, or molybdenum oxide may be employed, deposited on a suitable carrier. Additional catalytic agents and compounds are suggested in U.S. Patent No. 2,056,911. It will be evident that a large number of suitable catalytic agents are available, for usage in bed 4.

Finally, the present invention is not restricted to an apparatus involving reformer tubes. Thus, the process of the present invention also broadly comprises a reform system consisting of a single large reform vessel or container, in which extensive beds of metallic particles and hydrocarbon reform catalyst are provided. The beds may be externally heated, or internal bayonet-type heaters may be dispersed through the beds. The beds may be vertically or horizontally adjacent to each other, with corresponding vertical or horizontal flow of the process gas stream.

An example of an industrial application of the process of the present invention will now be described.

*Example*

A typical petroleum naphtha was vaporized and reformed in a test run of the process of the present invention. The naphtha specification included the following:

| | |
| --- | --- |
| Initial boiling range, ° F. | 114–120 |
| End point, ° F. | 229–248 |
| Specific gravity @ 60° F. | 0.66 |
| Composition (wt. percent) paraffins | 92.4–93.0 |
| Naphthenes | 6.2–7.5 |
| Aromatics | 0.1–1.1 |
| Olefins | 0.1–0.2 |

This material was vaporized and reacted with a preheated stream of steam and air. Molar steam to carbon ratio in the mixed process stream was 6 to 1, and air to carbon ratio was 1 to 1. The catalyst consisted of nickel rings inlet half, and nickel oxide on kaolin plus binder in outlet half. The following operating conditions were maintained during the test run.

| | |
| --- | --- |
| Residence time, sec | 0.35 |
| Linear velocity, ft./sec. | 15 |
| Space velocity, S.C.F. naphtha/hr.-ft.³ catalyst | 655 |
| Reform inlet temperature, ° F. | 1635–1655 |
| Reform exit temperature, ° F. | 1650–1675 |
| Pressure, p.s.i.g. | 150–160 |

These equilibrium operating conditions were maintained without carbon deposition in the apparatus employed in the process of the present invention. The vaporized naphtha was continuously reformed to yield a synthesis gas for ammonia manufacture.

We claim:

1. Process for catalytic steam reforming of a normally liquid naphtha which comprises vaporizing said liquid naphtha, combining the vaporized naphtha with steam and preheated air, contacting the resulting mixed process stream with a first catalyst bed consisting entirely of metallic nickel particles without a carrier at a temperature in the range of 1600° F. to 1675° F., said first catalyst bed having high thermal conductivity, whereby partial steam reforming of the naphtha takes place without deposition of free carbon, contacting the resulting partially reacted process stream at a temperature in the range of 1600° F. to 1675° F. with a second catalyst bed comprising active hydrocarbon reforming catalyst selected from the group consisting of nickel oxide, zirconia, chromia and molybdenum oxide deposited on a suitable carrier, and recovering a final gas stream comprising synthesis gas substantially free of unreacted naphtha and free carbon.

2. Process of claim 1, in which said active hydrocarbon reforming catalyst comprises nickel oxide deposited on kaolin particles.

3. Process of claim 1, in which the initial mixed process stream is provided with a molar steam to carbon ratio of about 6 to 1 and an air to carbon ratio of about 1 to 1, whereby said final gas stream comprises crude ammonia synthesis gas.

4. Process of claim 1, in which said mixed process stream is contacted with said catalyst beds at a pressure in the range of 150 to 160 p.s.i.g.

5. A process for the catalytic steam reforming of naphtha which comprises reacting a naphtha vapor stream with steam and preheated air in a non-catalytic reaction zone without reaching reaction equilibrium, contacting the resulting mixed process stream with a first catalyst bed consisting entirely of metallic nickel particles without a carrier at a temperature in the range of 1600° F. to 1675° F., said first catalyst bed having high thermal conductivity, whereby partial steam reforming of the naphtha takes place without deposition of free carbon, contacting the resulting partially reacted process stream at a temperature in the range of 1600° F. to 1675° F., with a second catalyst bed comprising active hydrocarbon reforming catalyst selected from the group consisting of nickel oxide, zirconia, chromia and molybdenum oxide deposited on a suitable carrier, and recovering a final gas stream comprising synthesis gas substantially free of unreacted naphtha and free carbon.

6. The process of claim 5, in which said active hydrocarbon reforming catalyst comprises nickel oxide deposited on kaolin particles.

7. The process of claim 5, in which the flow rate of said naphtha vapor stream relative to said steam and said preheated air provides an initial steam to carbon ratio of about 6 to 1 and an initial air to carbon ratio of about 1 to 1 in said non-catalyst reaction zone, whereby said final gas stream comprises crude ammonia synthesis gas.

8. The process of claim 5, in which said mixed process stream is contacted with said catalyst beds at a pressure in the range of 150 p.s.i.g. to 160 p.s.i.g.

9. The process of claim 5, in which said steam and said preheated air are initially mixed, prior to reaction with said naphtha vapor stream.

References Cited by the Examiner

UNITED STATES PATENTS

| | | | |
|---|---|---|---|
| 2,056,911 | 10/1936 | Schiller et al. | 23—212 |
| 2,940,840 | 6/1960 | Shapleigh | 48—215 |
| 2,943,062 | 6/1960 | Mader | 252—373 |

FOREIGN PATENTS 597,393    5/1960    Canada.

LEON ZITVER, *Primary Examiner.*

H. T. MARS, *Assistant Examiner.*